No. 761,552. PATENTED MAY 31, 1904.
C. T. & F. P. SMITH.
CHEESE BOX.
APPLICATION FILED JAN. 25, 1904.
NO MODEL.
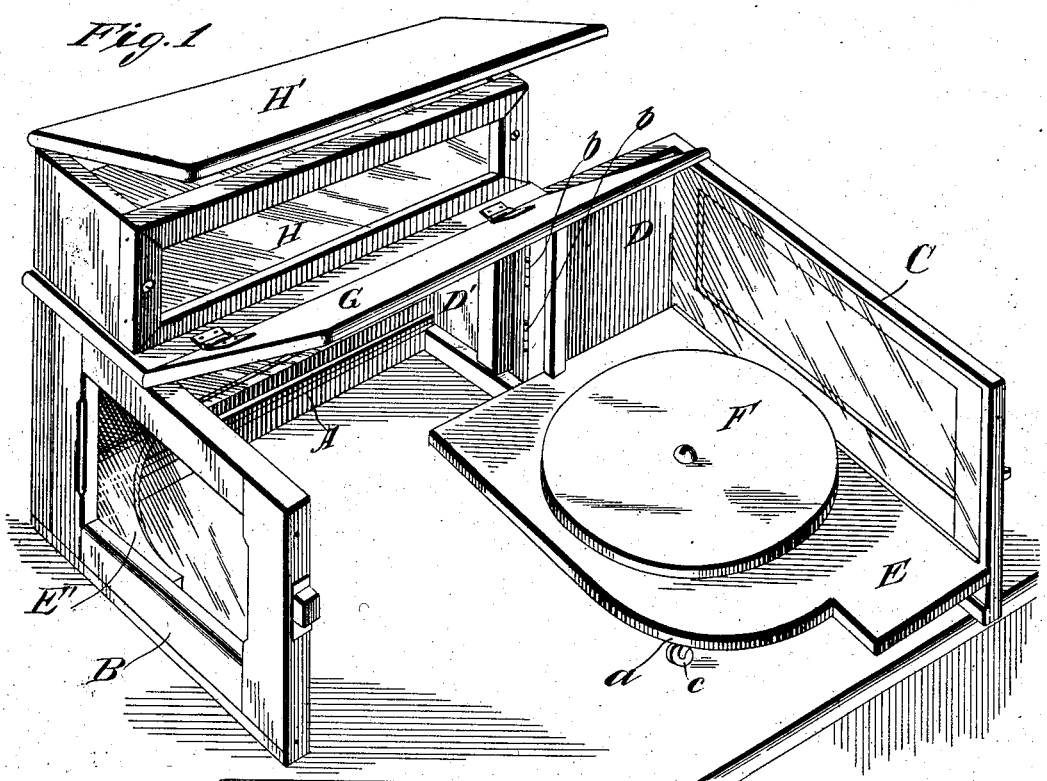
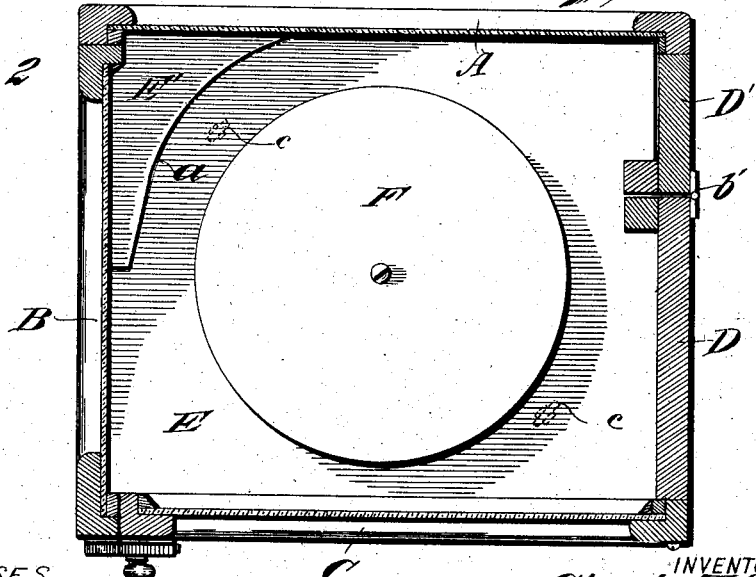
WITNESSES
C Edward Duffy
Edw. W. Byrn
INVENTORS
Charles T. Smith
Frank P. Smith
BY Munn & Co.
ATTORNEYS No. 761,552. Patented May 31, 1904.

UNITED STATES PATENT OFFICE.

CHARLES T. SMITH AND FRANK P. SMITH, OF CANON CITY, COLORADO.

CHEESE-BOX.

SPECIFICATION forming part of Letters Patent No. 761,552, dated May 31, 1904.

Application filed January 25, 1904. Serial No. 190,607. (No model.)

*To all whom it may concern:*

Be it known that we, CHARLES T. SMITH and FRANK P. SMITH, citizens of the United States, residing at Canon City, in the county of Fremont and State of Colorado, have invented a new and useful Improvement in Cheese-Boxes, of which the following is a specification.

Our invention relates to cheese-boxes for the use of retailers which are designed to so inclose the cheese as to protect it from insects and from drying out and are provided with doors to permit the insertion and removal of the cheese and to give access to the cheese in cutting the same. Such cheese-boxes usually have a turn-table upon which the cheese is mounted and upon which it is turned as its segments are successively cut off.

Our invention comprehends these general features; and it consists in such construction of the side walls, doors, and floor bearing the turn-table as to give a more convenient manipulation and freer access to the cheese and to occupy less space on the counter, as will be hereinafter more fully described with reference to the drawings, in which—

Figure 1 is a perspective view of our cheese-box open, and Fig. 2 is a horizontal section through the same when closed.

In the drawings, A, B, C, and D D' represent the four side walls of the box. As shown, the three walls A, B, and C are glazed and D D' is made with solid walls or panels. These walls may, however, all be glazed, if desired, or they may be provided with gauze-wire panels.

E is the floor of the box. This floor is raised a couple of inches above the lower edges of the side walls, and said floor is made with a curved edge $a$ and is rigidly fixed to and movable with the front wall C and portion D of one of the side walls. This portion D of the solid side wall is hinged about a vertical axis to the smaller portion D' by means of hinges $b\ b$.

The floor E is provided on its under side with one, two, or more caster-rollers $c\ c$, the lower surfaces of which rollers are in the same horizontal plane with the lower edges of the side walls, which latter rest solidly upon the counter, table, or shelf. This floor also bears in central position the turn-table F, upon which the cheese is supported.

When the front wall C and part D of the side wall are swung out about the hinges $b\ b$, the floor moves with them and brings the cheese slightly forward and off to one side in a conveniently accessible position on the counter, the floor being supported in this movement by the caster-wheels, which travel over the surface of the counter and give a solid support to resist the cutting strain. In this movement it will be seen that the floor does not move toward the salesman off the edge of the counter, but moves to one side by virtue of the position of the hinges $b\ b$, and thus keeps its bearing, even upon relatively narrow counters or shelves, and thus economizes space and does not crowd the salesman, but, on the contrary, gives ample space for the free use of his elbows in cutting or manipulating the cheese. The curve-line $a$ of the floor is specially related to the position of the hinges $b\ b$ and the lateral swing of the floor, in that this curved line $a$ cuts away the angular corner that would interfere with this lateral swing. The complementary or stationary part E' of the floor is rigidly fixed in the corner of the two side walls A and B and serves the double purpose of completing the floor when the box is closed and also acts as an angle-bracket to stiffen and brace the two side walls A and B.

On top of the main side walls of the case there is a hinged lid G, which may be raised to give a larger access to the cheese, and on top of the main case we also prefer to place a supplementary case H, with a hinged lid H', in which jars or small packages of cheese may be kept. This supplementary case may, if desired, be dispensed with.

The advantages of our cheese-box are that it not only keeps the cheese clean and moist and free from flies, but it can be placed either upon the base-shelf of the shelving of any store or on the counter, as it takes up very little space and can easily be opened in either place without crowding the salesman. The floor of the box being also low down, the cheese is but little higher than the counter and can be conveniently cut, as the position of the arm and weight of the salesman are sufficiently above it.

As the floor and turn-table swing laterally the salesman has plenty of room to place the heavy cheese in position in the box, and as the box is adapted to be placed on the counter or base-shelf it is accessible only from a position behind the counter and cannot be tampered with by customers. It is also especially adapted for holding the self-weighing cheese-knife used in grocery-stores. A further advantage is that the floor and turn-table come completely out of the case and are easily cleaned.

Having thus described our invention, what we claim as new, and desire to secure by Letters Patent, is—

1. A cheese-box having its floor, its front wall and part of its side wall built as a unitary structure and hinged about a vertical axis to the other portion so as to be integrally swung to one side to fully expose the cheese-support substantially as described.

2. A cheese-box having its floor, its front wall and part of its side wall built as a unitary structure and hinged about a vertical axis to the other portion so as to be integrally swung to one side and having a turn-table mounted upon said movable floor substantially as described.

3. A cheese-box, consisting of two vertical side walls and a stationary floor-segment connecting and bracing the same at the angle of the two and a movable portion consisting of a front wall, a portion of the side wall and the main floor connected together as a unitary structure and hinged to the other portion so as to be integrally swung to one side substantially as described.

4. A cheese-box consisting of two vertical side walls and a floor-segment located above the lower edges of the side walls at the angle between the same and connecting and bracing the two, and a movable portion consisting of a front wall and a portion of the side wall and the main floor connected together as a unitary structure and hinged to the other portion about a vertical axis, and rollers arranged beneath said movable floor and having their lower surfaces in the plane of the lower edges of the stationary side walls substantially as described.

5. A cheese-box having its floor, its front wall and part of its side wall built as a unitary structure and hinged about a vertical axis to the other portion and having one corner of the floor cut away with reference to the radial swing of the hinge to permit the hinged portion to move to a position at one side of the box substantially as described.

CHARLES T. SMITH.
FRANK P. SMITH.

Witnesses:
EMIL KLUNKER.
W. B. DEEMS.